United States Patent [19]

Fletcher, Jr.

[11] 4,388,622
[45] Jun. 14, 1983

[54] DOUBLE SIDEBAND LINEAR FREQUENCY MODULATION SYSTEM FOR RADAR APPLICATIONS

[75] Inventor: Robert H. Fletcher, Jr., Westlake Village, Calif.

[73] Assignee: The United States of America as represented by the Secretary of the Army, Washington, D.C.

[21] Appl. No.: 254,237

[22] Filed: Apr. 15, 1981

[51] Int. Cl.³ .................. G01S 13/34; G01S 13/58
[52] U.S. Cl. ..................... 343/14; 343/5 NQ; 343/9 R
[58] Field of Search ........ 343/14, 9 R, 17.5, 17.2 PC, 343/5 NQ

[56] References Cited

U.S. PATENT DOCUMENTS 2,695,995  11/1954  Cauchois .................. 343/14 X
4,302,758  11/1981  Tomasi .................... 343/9 R

FOREIGN PATENT DOCUMENTS 648810  1/1951  United Kingdom ............... 343/9

OTHER PUBLICATIONS

M. I. Skolnik, "Introduction to Radar Systems", 1962, pp. 86-103, discloses block diagrams of CW radar techniques, as for example FIGS. 3.11, 3.14, and 3.19; also, a CW ranging technique is discussed at p. 88 which uses both up and down chirp signals, however the sequential technique does not coherently combine the signals, resulting in a loss in detection capability.

Primary Examiner—Maynard R. Wilbur
Assistant Examiner—Robert C. Burk
Attorney, Agent, or Firm—Robert P. Gibson; Anthony T. Lane; Freddie M. Bush

[57] ABSTRACT

A double sideband linear frequency modulation technique for radar applications is disclosed for obtaining simultaneous range and doppler measurements. The method of obtaining measurements is useful in a variety of radar applications; however, the most promising area is in continuous wave radar systems. Linear Frequency Modulated (LFM) waveforms of both increasing and decreasing frequency are simultaneously transmitted. Upon reception, these sideband signals are combined coherently to give an output that is a function of the target's radial velocity. The received signals are also processed separately to obtain target ranging information.

7 Claims, 2 Drawing Figures

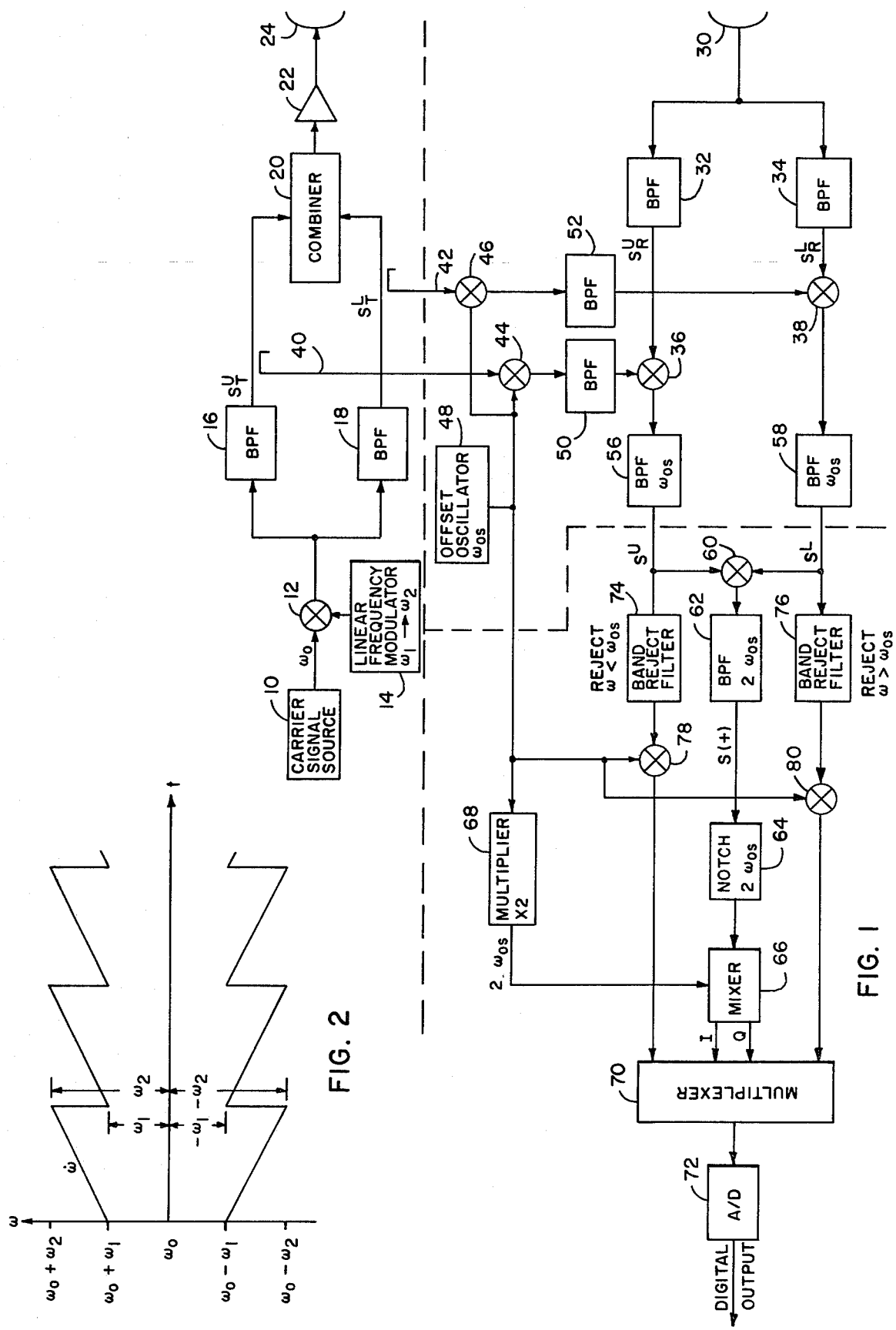

4,388,622

DOUBLE SIDEBAND LINEAR FREQUENCY MODULATION SYSTEM FOR RADAR APPLICATIONS

DEDICATORY CLAUSE

The invention described herein may be manufactured, used, and licensed by or for the Government for governmental purposes without the payment to me of any royalty thereon.

BACKGROUND OF THE INVENTION

While continuous wave (CW) radars have a number of important advantages over other radar systems for some applications, CW systems have several problems. First, some type of modulation must be applied to the signal to provide target ranging information. Additionally, the radar is transmitting and receiving at the same time, which imposes stringent isolation requirements and, for ground-based radars, generates severe near-in clutter problems. Further, incorporation of the ranging modulation may tend to aggravate the isolation and clutter problems.

Several modulation techniques have been proposed for providing the signal bandwidth required for target ranging. One method incorporates the bi-phase modulation of a CW carrier according to a particular code, such as an m-sequence pseudo-random code. The most commonly used approach, however, is that of the Linear Frequency Modulated (LFM) carrier. This well-known method is discussed in numerous radar texts.

The LFM waveform does have some significant problems. These problems arise from the inherent coupling of the target range and velocity in the radar return signal. This coupling is manifested by a skewed ridge on the LFM waveform ambiguity diagram. In certain applications the effects of the range-doppler coupling can be reduced. In reducing the coupling, the approach usually involves the sequential transmission of different modulated signals. This, in turn, requires two separate sequential detections. Moreover, the problem is dramatically complicated by the presence of clutter, which cannot be neglected for ground-based radar applications. The coupling of the range and doppler terms in the return signal causes stationary ground clutter to appear in the doppler bandwidth of interest. Since these clutter signals may easily mask target returns, special efforts must be taken to eliminate the clutter, such as totally rejecting all returns from one-half of the doppler spectrum.

Ranging techniques are discussed in the literature. For example, "Introduction to Radar Systems" by M. I. Skolnik, McGraw-Hill Book Company, 1962, discusses continuous wave and frequency modulated radar in Chapter 3. In particular, section 3.3, pages 86–103, discloses block diagrams of several CW radar techniques. On page 88 a CW ranging technique is discussed which uses both up and down chirp signals. In this approach, the signals are transmitted sequentially. Furthermore, the sequential technique does not coherently combine the signals, and this results in a loss in detection capability.

SUMMARY OF THE INVENTION

The double sideband linear frequency modulation system provides a method for obtaining range and doppler measurements simultaneously. The upper and lower sidebands of a linear frequency modulated carrier are simultaneously transmitted. On reception, the two signals are coherently combined to give a signal in which the range and doppler terms have been decoupled and for which conventional doppler techniques can be employed to reject stationary clutter and detect moving targets. The coherent combination of the two sidebands significantly improves radar performance since the time required to obtain the measurement data is reduced to one-half that of the sequentally transmitted method. The sideband signals themselves can also be processed separately to provide measurements from which target range may be computed once the radial velocity is known. One of the processed sideband signals covers the approaching target spectrum while the other sideband is used for ranging measurements of receding targets.

BRIEF DESCRIPTION OF THE DRAWINGS

FIG. 1 is a block diagram of a preferred embodiment of the double sideband linear frequency modulation system.

FIG. 2 is a diagram of a double sideband waveform which may be transmitted by the system of FIG. 1.

DESCRIPTION OF THE PREFERRED EMBODIMENT

Referring now to the drawings, FIG. 1 discloses a preferred embodiment of a system for providing double sideband linear frequency modulation (LFM). In FIG. 1 a carrier signal source 10 provides carrier signal $\omega_0$ to a mixer 12 where it is modulated with a swept frequency from LFM 14, sweeping linearly between $\omega_1$ and $\omega_2$. The output of mixer 12 is coupled to two bandpass filters 16 and 18 for obtaining respective upper and lower sidebands for transmission. These sidebands are coupled to a signal combiner 20 where they are summed. The summed signals are then amplified in amplifier 22 and transmitted by antenna 24. (Alternatively, the sidebands can be amplified separately and combined in the feed network of the transmit antenna.)

Upon reflection by a target, the returned sidebands are received by antenna 30, separated by respective upper and lower sideband bandpass filters 32 and 34. The upper sideband, $S_R^U$ and lower sideband, $S_R^L$ signals are coupled to respective mixers 36 and 38. A portion of the transmitted upper and lower sideband signals are coupled as reference signals to the receiver, as by cables 40 and 42 or other direct connection means to mixers 44 and 46 respectively. A local or offset oscillator 48 provides an output $\omega_{os}$ which is mixed with $S_T^U$ and $S_T^L$ in mixers 44 and 46. Outputs of mixers 44 and 46 are respectively filtered in bandpass filters 50 and 52 which provide sidebands for mixing in respective mixers 36 and 38 with the corresponding received sidebands. Outputs of mixers 36 and 38 are then filtered by respective bandpass filters 56 and 58 and coupled to a mixer 60. The output of mixer 60 is coupled through a bandpass filter 62 centered at $2\omega_{os}$ so that the sum sideband (S+) is passed. The output of filter 62 is the desired signal for performing target detection or presence and velocity measurement. A notch filter 64 at $2\omega_{os}$ allows clutter to be removed. The signal may then be mixed down to video by mixing with $2\omega_{os}$ in mixer 66 to provide the in-phase and quadrature (I and Q) channel outputs. Typically, $2\omega_{os}$ is obtained by multiplying the output of offset oscillator 48 by 2 in a multiplier 68. The I and Q channel outputs can now be processed according to established procedures to provide target velocity. Typically, the I and Q outputs may be digitized by coupling the signals through analog-to-digital converters and filtered, such as with a bank of narrow-band filters (not shown), or as shown in FIG. 1 the I and Q outputs may be processed through a multiplexer 70 to an A/D converter 72 for providing the digital output indicative of target velocity.

The outputs of bandpass filters 56 and 58 are also coupled respectively to band rejection filters 74 and 76. Filter 74 is tuned to reject the signal $\omega < \omega_{os}$ and filter 76 is tuned to reject $\omega > \omega_{os}$, allowing the desired signals to be passed while eliminating stationary clutter. The outputs of respective filters 74 and 76 are coupled to respective mixers 78 and 80 when they are mixed with the offset oscillator output $\omega_{os}$ to reject large clutter returns. These signals are then processed through multiplexer 70 and converter 72 where they are processed digitally to determine the range.

The double sideband LFM system involves simultaneously transmitting both the increasing and the decreasing frequency waveforms (upper and lower sidebands) as is shown typically in FIG. 2. As $\omega_0$ is generated along the time axis, $\omega_0$ is modulated by a signal varying from $\omega_1$ to $\omega_2$ and then repeating itself to provide a sawtooth waveform. The slope of the wave is $\dot{\omega}$ is equal to $\Delta\omega/\Delta t$. The upper and lower sidebands to be transmitted are then separated by the filters 16 and 18 such that $$S_T^U = \sin\left[(\omega_o + \omega_1)t + \frac{\dot{\omega}t^2}{2} + \phi_o\right] \quad (1)$$

and $$S_T^L = \sin\left[(\omega_o - \omega_1)t - \frac{\dot{\omega}t^2}{2} + \phi'_o\right] \quad (2)$$

where $\phi_0$ and $\phi_0'$ are arbitrary phase terms which may exist initially but cancel out in processing. Since the information of interest is contained in the frequency terms, the signal amplitudes can be ignored and are therefore not shown. The signals are summed, amplified, and transmitted. Upon reception of a reflected signal the two sidebands are again separated with filters. The sideband returns from an object at some range $R_o$ with a radial velocity of $V_r$ and can be written as $$S_R^U = \quad (3)$$

$$\sin\left\{\left[\omega_o + \omega_1 - \frac{2\dot{\omega}R_o}{c} + \frac{2v_r}{c}(\omega_o + \omega_1) - \frac{4\dot{\omega}v_r R_o}{c^2}\right]t + \right.$$

$$\left[\frac{2\dot{\omega}v_r}{c} + \frac{\dot{\omega}}{2} + \frac{2\dot{\omega}v_r^2}{c^2}\right]t^2 +$$

$$\left.\frac{2\dot{\omega}R_o^2}{c^2} - \frac{2(\omega_o + \omega_1)}{c}R_o + \phi_o\right\}$$

and $$S_R^L = \quad (4)$$

$$\sin\left\{\left[\omega_o - \omega_1 - \frac{2\dot{\omega}R_o}{c} + \frac{2v_r}{c}(\omega_o - \omega_1) + \frac{4\dot{\omega}v_r R_o}{c^2}\right]t - \right.$$

$$\left[\frac{2\dot{\omega}v_r}{c} + \frac{\dot{\omega}}{2} + \frac{2\dot{\omega}v_r^2}{c^2}\right]t^2 -$$

$$\left.\frac{2\dot{\omega}R_o^2}{c^2} - \frac{2(\omega_o - \omega_1)}{c}R_o + \phi'_o\right\}$$

where c is the speed of light. The offset oscillator output is mixed with $S_T^U$ and $S_T^L$ and one of the sidebands of each is then mixed with the corresponding received sidebands. The offset oscillator allows the received signal to be shifted to a convenient intermediate frequency for subsequent controlled processing. These combined signals are then filtered in filters 56 and 58 to provide $$S^U = \quad (5)$$

$$\cos\left\{\left[\omega_{os} + \frac{2v_r}{c}(\omega_o + \omega_1) - \frac{2\dot{\omega}R_o}{c}\left(1 + \frac{2v_r}{c}\right)\right]t + \right.$$

$$\frac{2\dot{\omega}v_r}{c}\left(1 + \frac{v_r}{c}\right)t^2 + \frac{2\dot{\omega}R_o^2}{c^2} - \frac{2(\omega_o + \omega_1)R_o}{c}\right\}$$

and $$S^L = \quad (6)$$

$$\cos\left\{\left[\omega_{os} + \frac{2v_r}{c}(\omega_o - \omega_1) + \frac{2\dot{\omega}R_o}{c}\left(1 + \frac{2v_r}{c}\right)\right]t - \right.$$

$$\left.\frac{2\dot{\omega}v_r}{c}\left(1 + \frac{v_r}{c}\right)t^2 - \frac{2\dot{\omega}R_o^2}{c^2} - \frac{2(\omega_o - \omega_1)R_o}{c}\right\}.$$

The signals $S^U$ and $S^L$ are then fed to mixer 60. Mixer 60 output passes through the filter 62 at 2 $\omega_{os}$ to pass the sum sideband $$S(+) = \cos\left[\left(2\omega_{os} + \frac{4v_r\omega_o}{c}\right)t - \frac{4\omega_o R_o}{c}\right]. \quad (7)$$

This is the desired signal for performing target detection and velocity measurement since velocity is determined from the frequency term in parenthesis. Since the frequency component of the signal is independent of range ($R_o$), stationary clutter can be eliminated with the clutter notch at 2 $\omega_{os}$. After the signal is mixed down to video, the I and Q channels can be digitized and narrow-band doppler filtering can be accomplished with a fast Fourier transform to provide target velocity, according to well established methods.

Once target velocity $V_r$ has been determined, $S^U$ and $S^L$ as given by equations (5) and (6) can be used to find the target range. Neglecting the constant phase terms, 2 $\omega_o R_o/c$, and assuming that $V_r$ is much less than the speed of light, c, equations (5) and (6) become $$S^U = \cos\left\{\left[\omega_{os} + \frac{2v_r}{c}(\omega_o + \omega_1) - \frac{2\dot\omega R_o}{c}\right]t + \frac{2\dot\omega v_r}{c}t^2\right\} \quad (8)$$

and $$S^L = \cos\left\{\left[\omega_{os} + \frac{2v_r}{c}(\omega_o - \omega_1) + \frac{2\dot\omega R_o}{c}\right]t - \frac{2\dot\omega v_r}{c}t^2\right\}. \quad (9)$$

If the waveform time-bandwidth product, which equals $\dot\omega t^2$, is less than $\frac{1}{8}(c/v_r)$, the effects of the quadratic phase terms are negligible and can be ignored. The signal frequencies can therefore be written as $$\omega^U \approx \omega_{os} + \frac{2v_r}{c}(\omega_o + \omega_1) - \frac{2\dot\omega R_o}{c} \quad (10)$$

and $$\omega^L \approx \omega_{os} + \frac{2v_r}{c}(\omega_o - \omega_1) + \frac{2\dot\omega R_o}{c}. \quad (11)$$

For stationary clutter, the signal frequency from equation (10) satisfies $\omega^U < \omega_{os}$. Similarly, equation (11) yields $\omega^L > \omega_{os}$ for zero velocity scatterers. These relations can therefore be used to reject large stationary clutter returns. Once the predominant clutter has been removed, the signals are mixed to baseband and processed digitally to determine the signal frequency. Once the frequency of $S^U$ or $S^L$ is known, $R_o$ can easily be determined or computed from equation (10) or (11) since $v_r$ is already known from $S(+)$.

Because of the band reject filters required to suppress the clutter, $S^U$ can be used only for approaching targets and $S^L$ is limited to receding targets. Moreover, it should be noted from equations (10) and (11) that there will be some moving targets suppressed as well. In particular, the ranging measurements will require for approaching targets that $$v_r > \frac{\dot\omega R_o}{\omega_o + \omega_1} \quad (12)$$

and for receding targets that $$v_r < -\frac{\dot\omega R_o}{\omega_o - \omega_1}. \quad (13)$$

Therefore, depending on the parameters $\omega$, $\omega_o$, and $\dot\omega$, even high velocity targets at long range may be cancelled along with the clutter. As $R_o$ decreases, however, the ranging measurements can be performed on slower targets. As has been noted, this problem applies only to the ranging signals and not to $S(+)$ as given by equation (7). The frequency of $S(+)$ is independent of target range. Hence, a moving target can still be detected and its velocity measured even if the ranging signals are suppressed in the clutter filters. Furthermore, minimum target ranges can be determined from equations (12) and (13) if $v_r$ is known and the return is not present in the filtered signals $S^U$ or $S^L$.

Although a particular embodiment and form of this invention has been illustrated, it will be apparent to those skilled in the art that modification may be made without departing from the scope and spirit of the foregoing disclosure. Therefore it should be understood that the invention is limited only by the claims appended hereto.

I claim:

1. In a radar system wherein a continuous wave of electromagnetic energy is transmitted toward an object and reflected energy is received from the object, the improvement of a double sideband linear frequency modulation system comprising: transmitting means providing upper and lower sidebands of a carrier signal with simultaneously increasing and decreasing transmitted frequency waveforms; receiving means adapted for receiving reflected portions of said transmitted waveforms, and for separating said reflected portions into said upper and lower sidebands of said carrier signal, said upper and lower portions of reflected energy having both range and doppler signal components therein simultaneously; and signal processing means for coherently combining the reflected sideband portions for separating the range and doppler signal components, said signal processing means comprising a first mixer having inputs adapted for receiving said reflected sideband portions for providing a sideband sum output, and a notch filter responsive to said sum output for eliminating clutter and thereby enhancing the frequency component of the signal output therefrom for determining radial velocity of the object.

2. A double sideband linear frequency modulation system as set forth in claim 1 wherein said signal processing means further comprises first and second band rejection filters having inputs coupled selectively to respective first mixer inputs, said first filter being coupled to receive said upper reflected sideband signal and said second filter being adapted to receive said lower reflected sideband signal for rejecting stationary clutter returns in the respective sidebands and thereby enhancing the signal frequency outputs therefrom for determining object range.

3. A double sideband linear frequency modulation system as set forth in claim 2 wherein said signal processing means further comprises a first bandpass filter coupled between the output of said first mixer and the notch filter, and a second mixer having a first input adapted for receiving the output of the notch filter; and said modulation system further comprising an offset oscillator circuit for providing selectable oscillator frequency outputs to said signal processing means, a first output of said offset oscillator circuit being coupled as a second input of said second mixer for mixing with said sum output of the notch filter to provide in-phase and quadrature channel output signals therefrom for obtaining said radial velocity of the object.

4. A double sideband linear frequency modulation system as set forth in claim 3 wherein said signal processing means further comprises third and fourth mixers coupled to receive respective first inputs from said first and second band reject filters outputs, coupled to receive respective second inputs from a second output of said offset oscillator for mixing the respective sideband signals to baseband.

5. A double sideband linear frequency modulation system as set forth in claim 4 and further comprising fifth and sixth mixers, means for coupling a portion of said upper and lower modulated sidebands from said transmitting means to respective first inputs of said fifth and sixth mixers, said offset oscillator second output being further coupled to the second inputs of said fifth and sixth mixers, second and third bandpass filters responsive to outputs of said fifth and sixth mixers respectively for providing a sideband output from each filter, seventh and eighth mixers having respective first inputs coupled to the respective outputs of said second and third bandpass filters, said seventh and eighth mixers having second inputs adapted for receiving respectively said reflected portions of said upper sideband and lower sideband of said carrier signal, and fourth and fifth bandpass filters having respective inputs coupled to the respective outputs of said seventh and eighth mixers for providing outputs as said first mixer inputs and said band rejection filter inputs.

6. In a radar system wherein a continuous wave of high frequency electromagnetic energy is transmitted toward an object and reflected energy is received from the object, the method of simultaneously processing both object range and doppler signal components coincident in a reflected energy waveform and comprising the steps of:

mixing a carrier signal frequency with a linear frequency modulator output signal and filtering the resultant mixed output for obtaining respective upper and lower modulated sideband waveforms in separate channels;

combining said sideband waveforms so that the upper sideband is increasing and the lower sideband is decreasing simultaneously at a linear frequency modulation rate;

transmitting the combined waveforms toward an object;

receiving portions of the combined waveforms reflected from an object;

filtering the received waveforms into the respective upper and lower sidebands in separate channels;

continuously mixing a reference signal portion of the transmitted upper and lower sidebands with respective upper and lower received sideband portions;

passing the continuously mixed upper sideband signal portion and continuously mixed lower sideband signal portion through respective bandpass filters and band rejection filters for removing clutter and providing ranging signals;

recombining portions of said continuously mixed lower sidebands and upper sidebands after passage of these signals through said bandpass filters and before passage through said band rejection filters for providing a summation signal output; and processing said summation signal through a bandpass filter and a notch filter to selectively obtain the frequency components comprising the in-phase and quadrature components for providing the object radial velocity.

7. The method of simultaneously processing both object range and doppler signal components coincident in a reflected waveform as set forth in claim 6 and further comprising the step of mixing an offset oscillator frequency with said reference signal portions of the respective upper and lower transmitted sidebands and filtering the mixed outputs thereof prior to combining the transmitted and received sideband portions.

* * * * *